(12) United States Patent
Lagree et al.

(10) Patent No.: US 10,153,118 B2
(45) Date of Patent: Dec. 11, 2018

(54) FRAME MODULE, CIRCUIT BREAKER INCLUDING THE SAME AND ASSOCIATED METHOD

(71) Applicant: EATON CORPORATION, Cleveland, OH (US)

(72) Inventors: James Leo Lagree, Robinson Township, PA (US); David Raymond Rohn, Venetia, PA (US); Paul Richard Rakus, Beaver Falls, PA (US); Robert Frederick Brooks, White Oak, PA (US); Yibo Chen, Suzhou (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 630 days.

(21) Appl. No.: 14/833,253

(22) Filed: Aug. 24, 2015

(65) Prior Publication Data
US 2017/0062166 A1    Mar. 2, 2017

(51) Int. Cl.
| | |
|---|---|
| *H01H 71/10* | (2006.01) |
| *H01H 71/04* | (2006.01) |
| *H01H 71/06* | (2006.01) |
| *H01H 71/02* | (2006.01) |
| *H02H 3/08* | (2006.01) |
| *H01H 71/74* | (2006.01) |
| *H01H 71/00* | (2006.01) |

(52) U.S. Cl.
CPC ........ *H01H 71/10* (2013.01); *H01H 71/0221* (2013.01); *H01H 71/04* (2013.01); *H01H 71/06* (2013.01); *H01H 71/74* (2013.01); *H01H 71/7409* (2013.01); *H02H 3/08* (2013.01); *H01H 2071/006* (2013.01); *H01H 2071/042* (2013.01); *H01H 2071/044* (2013.01)

(58) Field of Classification Search
CPC ..................................................... H02H 3/008
USPC ......................................................... 361/93.2
See application file for complete search history.

(56) References Cited

U.S. PATENT DOCUMENTS

| | | | |
|---|---|---|---|
| 4,958,252 | A | 9/1990 | Murphy |
| 6,346,869 | B1 | 2/2002 | Marple et al. |
| 6,804,101 | B2 | 10/2004 | Tignor et al. |
| 6,836,396 | B1 | 12/2004 | Tignor et al. |
| 2008/0158763 | A1* | 7/2008 | Dougherty ......... H01H 71/7409 361/93.2 |
| 2009/0122453 | A1 | 5/2009 | Vicente et al. |
| 2009/0257160 | A1 | 10/2009 | Vicente et al. |

OTHER PUBLICATIONS

European Patent Office, "International Search Report and Written Opinion", PCT/US2016/047458, dated Aug. 18, 2016, 11 pp.

* cited by examiner

*Primary Examiner* — Dharti H Patel
(74) *Attorney, Agent, or Firm* — Eckert Seamans (57) ABSTRACT

A frame module for a circuit breaker includes a first interface structured to connect to a trip unit, a second interface structured to connect to a frame, and a current rating storage unit structured to store a current rating associated with the frame and to provide the stored current rating to the trip unit when the trip unit is connected to the first interface.

21 Claims, 6 Drawing Sheets

FRAME MODULE, CIRCUIT BREAKER INCLUDING THE SAME AND ASSOCIATED METHOD

BACKGROUND

Field

The disclosed concept relates generally to circuit breakers, and more particularly, to circuit breakers including a frame and a trip unit. The disclosed concept also relates to methods of providing a current rating associated with a circuit breaker frame to a trip unit.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Circuit breakers include a frame and a trip unit. The frame includes all the various components of the circuit breaker except for the trip unit. The trip unit may be interchangeably used with frames of the same or a similar design. A family of circuit breakers may be a group of circuit breakers that use the same or similar frames.

Circuit breakers have an associated rated current (In) which is also commonly referred to as an ampere rating or continuous current rating. The rated current is the maximum continuous current a circuit breaker is designed to carry without tripping. A rating plug is a self-contained portion of a circuit breaker that is interchangeable and replaceable in a circuit breaker trip unit by the user to set the rated current of the circuit breaker. A frame size (also referred to as frame rating) is a term applied to a group of circuit breakers of similar physical configuration (e.g., without limitation, a family of circuit breakers). The frame size refers to the largest current rating available in the group.

A rating plug associated with a current rating that is higher than the frame size of a circuit breaker should not be installed in that circuit breaker. For example, a rating plug associated with an 4000 A current rating should not be installed in a circuit breaker with an 800 A frame size. This creates a dangerous situation as the circuit breaker will not trip until a current of 4000 A while the components of the circuit breaker are only certified for safe operation up to a maximum continuous current of 800 A.

To address this concern, a mechanical interlock scheme between circuit breakers and rating plugs has been employed. In more detail, rating plugs and circuit breakers are designed such that a rating plug having a higher current rating than the frame size of a circuit breaker will not physically be able to be plugged into the circuit breaker. Combinations of screw sizes, pins, spacers and mating standoffs in the rating plug and/or circuit breaker may be employed to ensure that only certain rating plugs may be physically plugged into a circuit breaker.

Among other problems with such mechanical interlock schemes is that they are not conducive to flexibility or expansion. Groups of circuit breakers are limited by mechanical space and available screw sizes, lengths and pitches. Additionally, changes in a group of circuit breakers, such as a redesign that increases or decreases the frame size of a group of circuit breakers, would require a new mechanical interlock scheme that matches the appropriate values of rating plugs with the frame size of the group of circuit breakers. Designing new mechanical interlock schemes for each new iteration of circuit breaker families will quickly lead to increasing mechanical complexity in order to support further new circuit breaker designs. Thus, the use of mechanical interlock schemes is not conducive to expansion.

There is room for improvement in circuit breakers and associated methods.

SUMMARY

These needs and others are met by embodiments of the disclosed concept, which are directed to a frame module, a circuit breaker including the same and an associated method, wherein the frame module is structured to store a current rating associated with a frame and to provide the current rating to a connected trip unit.

In accordance with aspects of the disclosed concept, a frame module for a circuit breaker including a frame and a trip unit comprises: a first interface structured to connect to the trip unit; a second interface structured to connect to the frame; and a current rating storage unit structured to store a current rating associated with the frame and to provide the stored current rating to the trip unit when the trip unit is connected to the first interface.

In accordance with other aspects of the disclosed concept, a circuit breaker comprises: a frame; a trip unit; and a frame module including: a first interface structured to connect to the trip unit; a second interface structured to connect to the frame; and a current rating storage unit structured to store a current rating associated with the frame and to provide the stored current rating to the trip unit when the trip unit is connected to the first interface.

In accordance with other aspects of the disclosed concept, a method of providing a current rating associated with a frame to a trip unit comprises: storing the current rating associated with the frame in a current rating storage unit of a frame module; connecting the frame module to the trip unit; and providing the stored current rating to the trip unit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

As employed herein, the terms "current rating", "rated current", "ampere rating", "continuous current rating" and "In" shall mean the maximum current a device such as a circuit breaker or frame of a circuit breaker is rated to continuously carry without tripping.

As employed herein, the terms "current setting", "ampere setting" and "Ir" shall mean the current a circuit breaker is set to continuously carry without tripping. It is adjustable and may be expressed as a percentage of the current rating.

Figure 1:
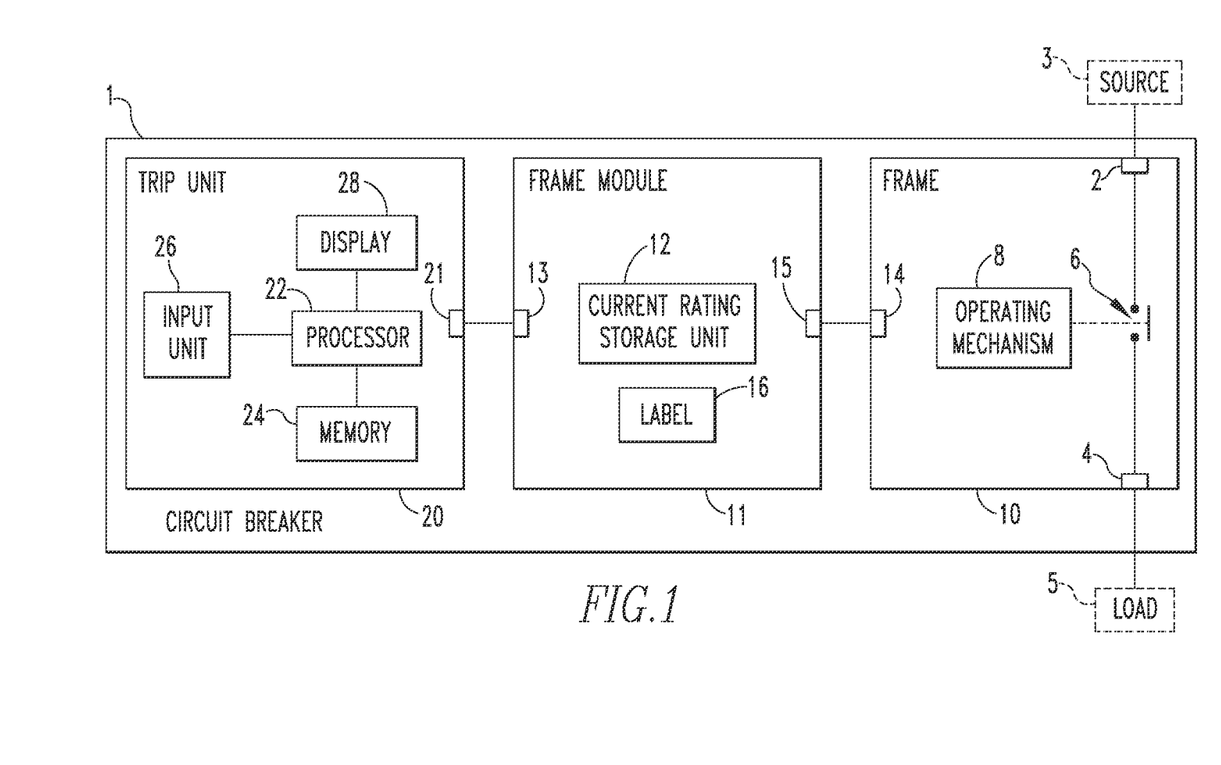
FIG. 1 is a schematic diagram of a circuit breaker in accordance with an example embodiment of the disclosed concept.

FIG. 1 is a schematic diagram of a circuit breaker 1 in accordance with an example embodiment of the disclosed concept. The circuit breaker 1 includes first and second terminals 2,4 electrically connected by electrical conductors such as busbars or other suitable electrical conductors. The first and second terminals 2,4 may be used to electrically connect the circuit breaker 1 with a power source 3 and load 5 external to the circuit breaker 1. The circuit breaker 1 further includes separable contacts 6 electrically connected between the first and second terminals 2,4. The separable contacts 6, when closed, allow electrical current to flow between the first and second terminals 2,4. When the separable contacts 6 open, the electrical connection between the first and second terminals 2,4 is broken and electrical current is unable to flow between them. An operating mechanism 8 included in the circuit interrupter 1 is structured to open or close the separable contacts 6.

The circuit breaker 1 is divided into a frame 10, a frame module 11 and a trip unit 20. The frame 10 and the trip unit 20 are connected together via the frame module 11 to form the circuit breaker 1. The frame 10 includes the first and second terminals 2,4, the separable contacts 6 and the operating mechanism 8. The frame module 11 includes a current rating storage unit 12. The current rating storage unit 12 may include memory such as any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The current rating storage unit 12 is structured to store the current rating (In) associated with the frame 10. The current rating storage unit 12 is also configured to provide the stored current rating to the trip unit 20. In some example embodiments of the disclosed concept, the current rating storage unit 12 is structured to transmit the stored current rating to the trip unit 20. In other example embodiments of the disclosed concept, the trip unit 20 is structured to access and read the stored current rating in the current rating storage unit 12.

The frame module 11 also includes a label 16. The label 16 may be, without limitation, an adhesive sticker that is applied to the frame module 11 and indicates the current rating associated with the frame 10. In some example embodiments of the disclosed concept, the label 16 is a display such as, without limitation, a bi-stable type of display that is structured to display the current rating associated with the frame 10. Bi-stable type displays require no power to maintain a display of information so if the current rating associated with the frame 10 is displayed on a bi-stable display, the current rating will continue to be displayed even after power is removed.

The frame 10 and the trip unit 20 are structured to mechanically and electrically connect with each other via the frame module 11. The frame module 11 includes a first interface 13 that is structured to connect to a corresponding interface 21 on the trip unit 20 and a second interface 15 that is structured to connect to a corresponding interface 14 on the frame 10. The frame module 11 is structured to exchange data with the trip unit 20 via the first interface 13. Signals from the trip unit 20 may also be passed through the frame module 11 to the frame 10 via the first and second interfaces 13,15, and similarly, signals from the frame 10 may be passed through the frame module 11 to the trip unit 20 via the first and second interfaces 13,15.

The trip unit 20 may be electrically and mechanically connected to the frame module 11 and then the combination of the trip unit 20 and the frame module 11 may be electrically and mechanically connected to the frame 10. The trip unit 20 may be interchangeable. That is, the trip unit 20 may be disconnected from the frame 10 and another trip unit (not shown) compatible with the frame 10 may be connected to the frame 10.

The trip unit 20 is structured to determine when to trip open the separable contacts and to control the operating mechanism 8 to trip open the separable contacts 6. The trip unit 20 may include a number of associated sensors such as, without limitation, one or more current sensors structured to sense current flowing between the first and second terminals 2,4. The trip unit 20 may use the outputs of the associated sensors to determine when to trip open the separable contacts 6.

The trip unit 20 includes a processor 22, a memory 24, an input unit 26 and a display 28. The processor 22 may be, for example and without limitation, a microprocessor, a microcontroller, or some other suitable processing device or circuitry, that interfaces with the memory 24. The memory 24 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

The processor 22 is structured to make the determination of when to trip open the separable contacts 6. The memory 24 is a computer readable medium structured to store information. The memory 24 may be structured to store, without limitation, settings of the trip unit 20 (e.g., without limitation; current setting ("Ir"); long delay time ("LDT"); short delay pickup ("SDPU"); short delay time ("SD Time")). The processor 22 may also use the stored current rating received from the frame 10 to set the current rating in the trip unit 20. This avoids the need for a rating plug to set the current rating in the trip unit 20.

The input unit 26 is structured to allow a user to input information (e.g., without limitation, trip unit settings) into the trip unit 20. The input unit 26 may be a physical interface such as, without limitation, a keyboard, input devices such as knobs or buttons, a touch screen, or any other suitable physical interface. The input unit 26 may also be an electronic interface such as, without limitation, an input port to allow a user to electronically input information to the trip unit 20 from an external electronic device such as a computer, a laptop, a tablet or any other suitable electronic device.

The display 28 is structured to display information. The display 28 may display information associated with the trip unit 20 such as, without limitation, the current trip unit 20 settings. The display 28 may display other information such as, without limitation, a cause of trip. The display 28 may also display the current setting stored in the current setting storage unit 12 of the frame 10. The display 28 may be any suitable type of display such as, without limitation, a light emitting diode (LED) display or a liquid crystal display (LCD). It is also contemplated that the display 28 may be a bi-stable display that only uses power to change the displayed content, but can maintain displayed content without power. It is further contemplated that the display 28 may be a combination type display that includes more than one type of display (e.g., without limitation, a bi-stable display area combined with an LED display area).

In some example embodiments of the disclosed concept, the trip unit 20 may be used to change the current rating stored in the current rating storage unit 12 of the frame module 11. For example and without limitation, the current rating storage unit 12 may initially store the current rating associated with the frame 10. However, a customer may request that a lower current rating be associated with the circuit breaker 1. After the trip unit 20 has been connected to the frame module 11, the trip unit 20 can be used to store a custom current rating in the current rating storage unit 12. The custom current rating can then be shown on the label 16 to indicate that it is the current rating associate with the circuit breaker 1.

By storing the current rating associated the frame 10, or a custom current rating associated with the circuit breaker, in the frame module 11 and then providing it to the trip unit 20, the trip unit 20 can receive the proper current rating without the need for rating plugs. Thus, rating plugs and their associated mechanical interlock scheme can be avoided. Rather, the current rating, which was electronically provided to the trip unit 20 can be used to set the current rating in the trip unit 20. Additionally, the current rating may be displayed on the display 28 of the trip unit 20 so that a user can determine what the current rating is.

In some exemplary embodiments of the disclosed concept, the current rating storage unit 12 is structured to store both a maximum current rating and a minimum current rating associated with the frame 10. The maximum current rating and the minimum current rating may then be shown on the label 16 or on the display 28 of the trip unit 20. The maximum current rating and the minimum current rating define a preferred range of continuous current associated with the frame 10.

Figures 2, 3:
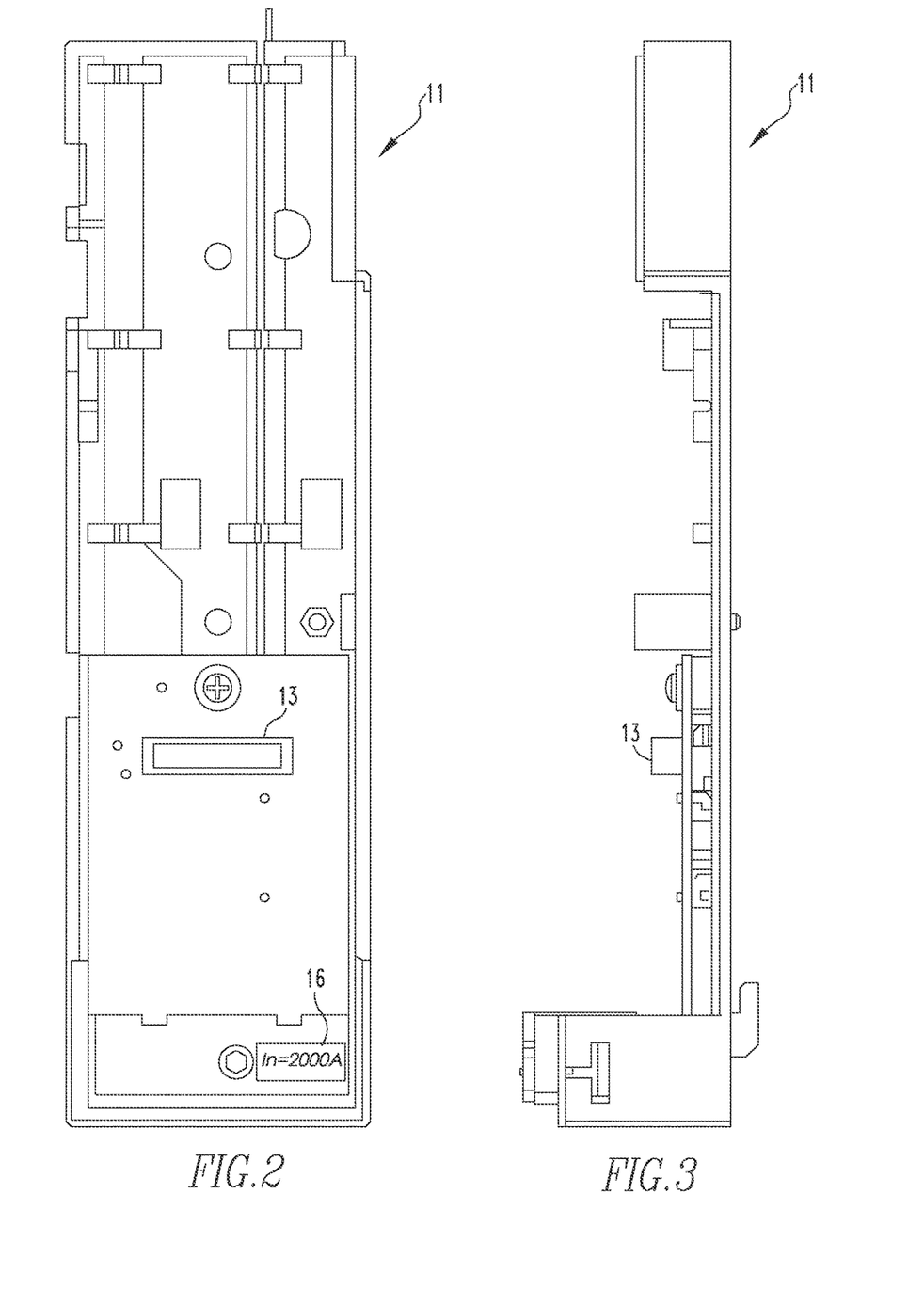
FIG. 2 is a front view of a frame module in accordance with an example embodiment of the disclosed concept.
FIG. 3 is a side view of the frame module of FIG. 2.

FIGS. 2 and 3 are front and side views, respectively, of the frame module 11 in accordance with an example embodiment of the disclosed concept. The frame module includes the current rating storage unit 12, the label 16, and the first and second interfaces 13,15, although the current rating storage unit 12 and the second interface 15 are not visible in FIGS. 2 and 3. As shown, for example, in FIG. 2, the label 16 may be placed in a location that is visible to a user of the frame module 11 so the user may visually verify the current rating stored in the current rating storage unit 12. Additionally, the user may visually verify that the current rating on the label 16 matches the current rating displayed on the display 28 of a trip unit 20, when a trip unit 20 is connected to the frame 10.

Figure 4:
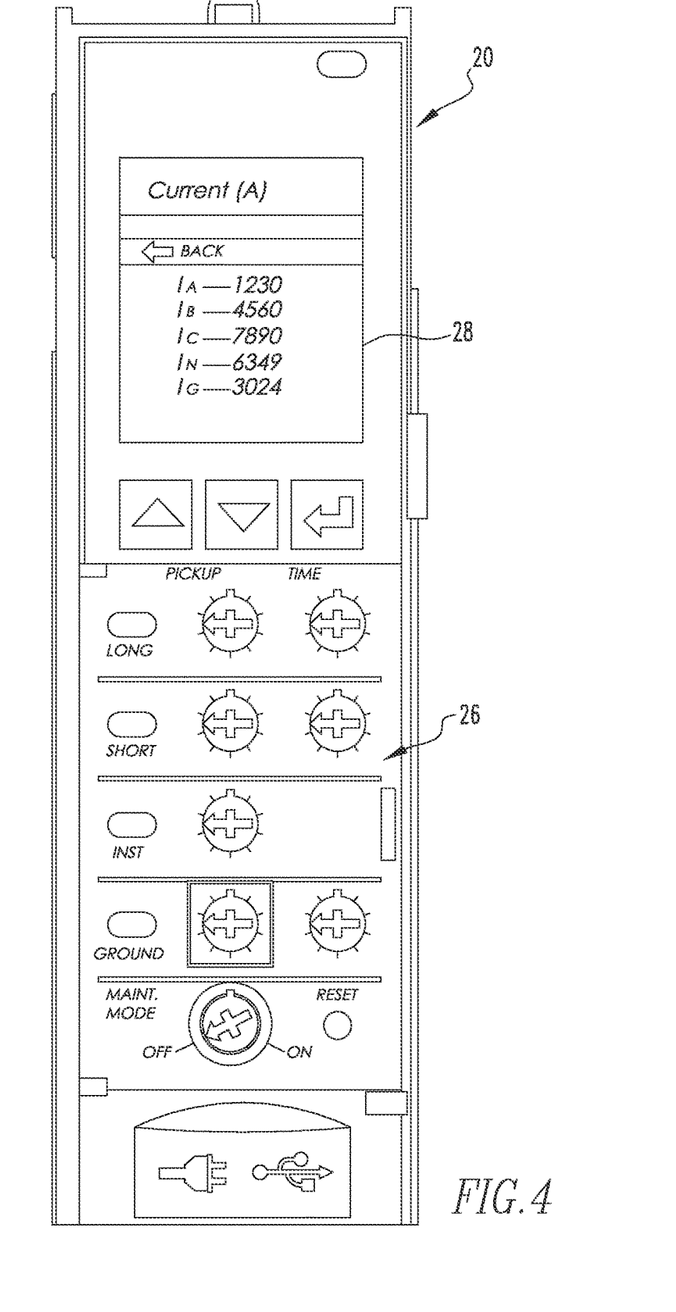
FIG. 4 is a front view of a trip unit in accordance with an example embodiment of the disclosed concept.

FIG. 4 is a front view of the trip unit 20 in accordance with an example embodiment of the disclosed concept. The trip unit 20 of FIG. 4 includes the interface 21, processor 22, memory 24, input unit 26 and display 28. However, the interface 21, processor 22 and memory 26 are not visible in FIG. 4.

Figure 5:
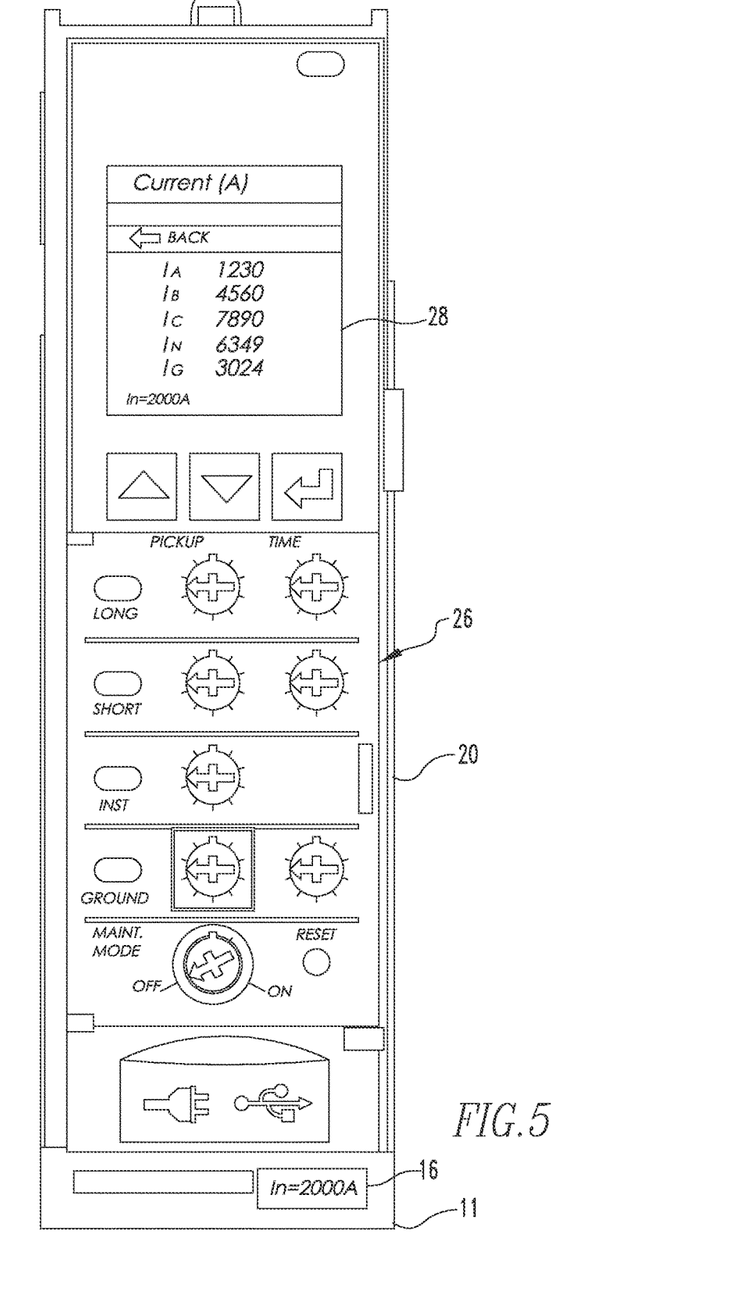
FIG. 5 is a front view of the frame module of FIGS. 2 and 3 connected to the trip unit of FIG. 4.

FIG. 5 illustrates the frame module 11 and the trip unit 20 connected together. As shown in FIG. 5, the label 16 is visible when the frame module 11 is connected to the trip unit 20. In this manner, a user can compare the current rating indicated on the label 16 with the current rating shown on the display 28. The same current rating should be shown on both the label 16 and the display 28.

Figure 6:
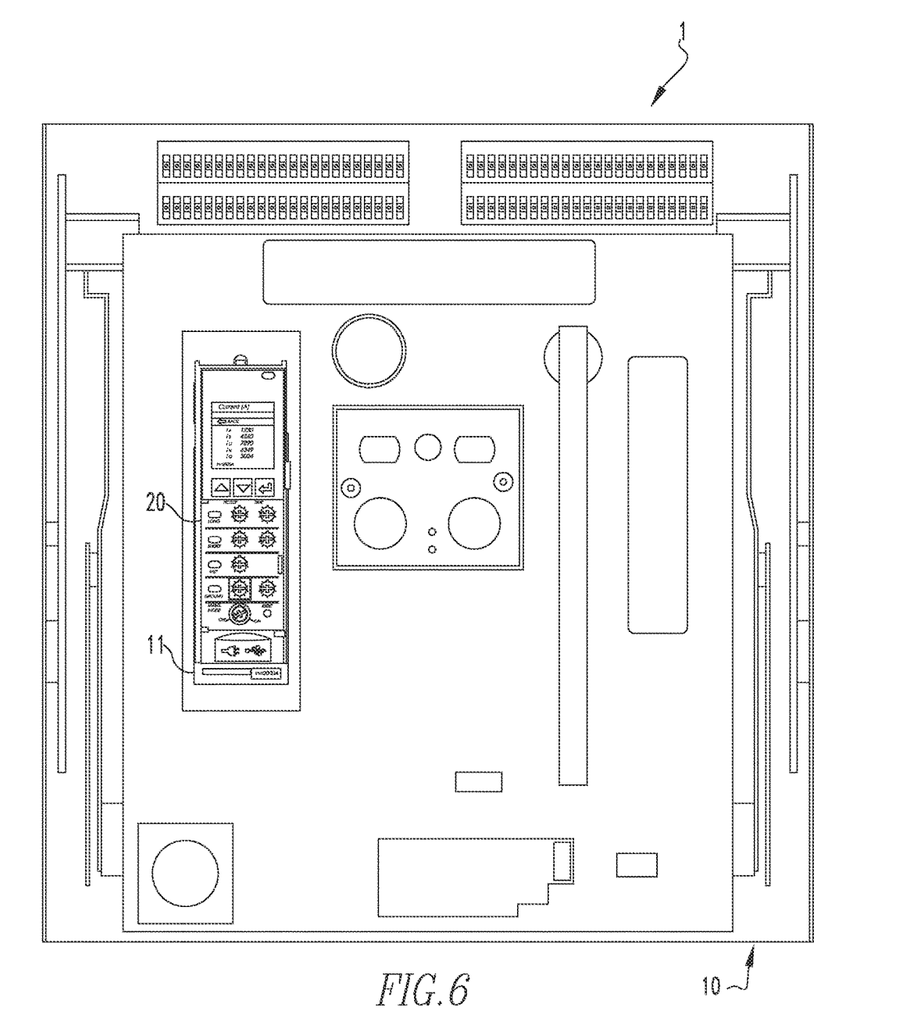
FIG. 6 is a front view of a circuit breaker in accordance with an example embodiment of the disclosed concept.

FIG. 6 is a front view of the circuit breaker 1 in accordance an example embodiment of the disclosed concept. The circuit breaker 1 includes the frame 10. The connected frame module 11 and trip unit 20 are connected to the frame 10, thus connected the trip unit 20 with the frame 10 via the frame module 11.

Figure 7:
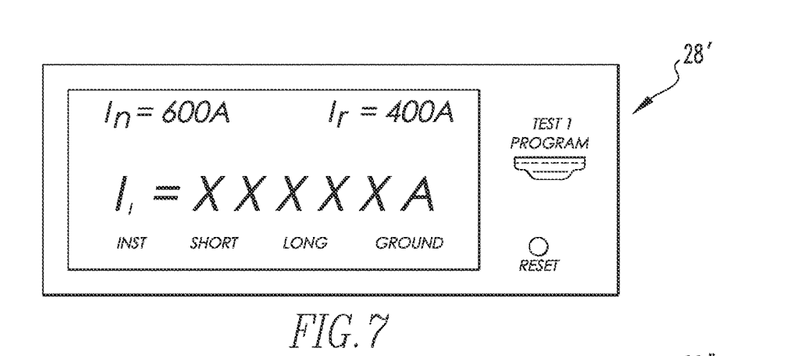
FIG. 7 is a front view of a display in accordance with an example embodiment of the disclosed concept.

FIG. 7 is a front view of a display 28' in accordance with an example embodiment of the disclosed concept. The display 28' includes a bi-stable display screen which may display the current rating and one or more trip unit settings such as the current setting. It is contemplated that the display 28 may be employed in any of the trip units 20,20',20" described herein without departing from the scope of the disclosed concept.

Figure 8:
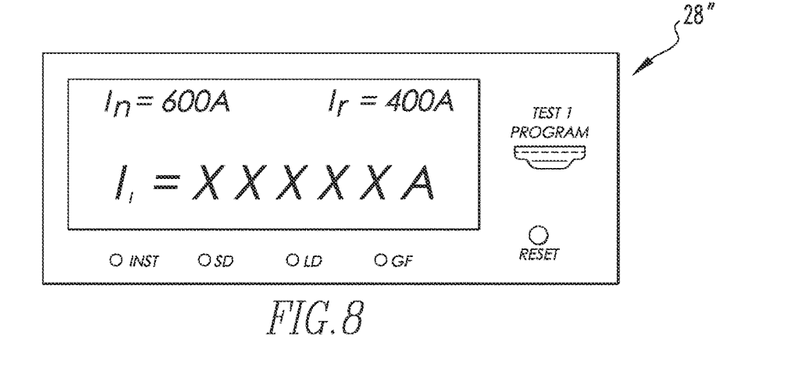
FIG. 8 is a front view of a display in accordance with another example embodiment of the disclosed concept.

FIG. 8 is a front view of a display 28" in accordance with another example embodiment of the disclosed concept. The display 28" includes a bi-stable display area and an LED display area. In this example embodiment, the current rating and one or more trip unit settings are displayed in the bi-stable display area. The LED display area includes one or more LEDs that are used to indicate a cause of trip. The bi-stable display area does not require power to maintain a display of content. The LED display area does require a small amount of power to remain lit. A power source such as a battery or capacitor may be associated with the LED display area so that one or more of the LEDs can remain lit after a loss of power to the display 28". It is contemplated that the display 28" may be employed in any of the trip units 20,20',20" described herein without departing from the scope of the disclosed concept.

Figure 9:
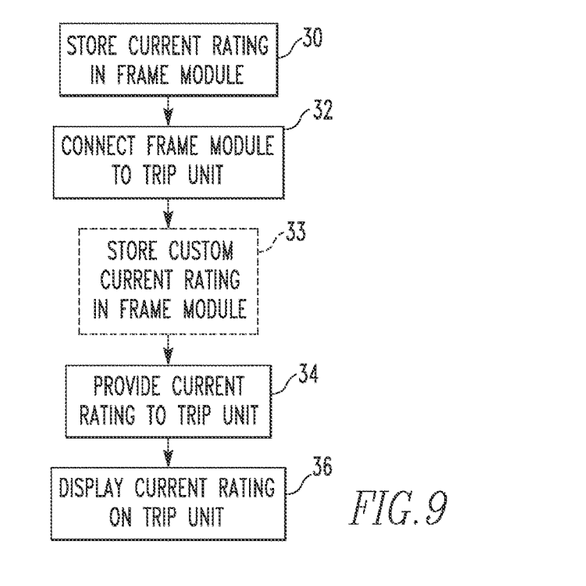
FIG. 9 is a flowchart of a method of providing a current rating to a circuit breaker and trip unit in accordance with an example embodiment of the disclosed concept.

FIG. 9 is a flowchart of a method of providing a current rating to a trip unit in accordance with an example embodiment of the disclosed concept. The method will be described in conjunction with the circuit breaker 1 of FIG. 1. However, it is contemplated that the method may be employed in conjunction with other circuit breakers without departing from the disclosed concept. Initially, the frame 10, frame module 11 and trip unit 20 are constructed. At 30, the current rating associated with the frame 10 is stored in the current rating storage unit 12 of the frame module 11. At 32, the frame module 11 is connected to the trip unit 20 via the first interface 13. Optionally, at 33, a custom current rating is stored in the current rating storage unit 12. The custom current rating 12 may be requested by a customer and may be set through the trip unit 20. At 34, the current rating stored in the current rating storage unit 12 is provided to the trip unit 20. At 36, the current rating is displayed on the display 28 of the trip unit 20. Although not illustrated, at any point, the frame module 11 and the trip unit 20 may be connected to the frame 10 to complete construction of the circuit breaker 1.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A frame module for a circuit breaker including a frame and a trip unit including a display structured to display information, the frame module comprising:
   a first interface structured to connect to the trip unit;
   a second interface structured to connect to the frame; and
   a current rating storage unit structured to store a current rating associated with the frame and to provide the stored current rating to the trip unit when the trip unit is connected to the first interface; and
   a label disposed on an exterior of the frame and indicating the current rating associated with the frame,
   wherein the trip unit is structured to display the stored current rating on the display,
   wherein the display is disposed on a front facing surface of the trip unit,
   wherein the label is disposed on a front facing surface of the frame module such that the stored current rating displayed on the display and the current rating associated with the frame indicated on the label are viewable simultaneously from a single viewpoint when the trip unit is connected to the frame module.

2. The frame module of claim 1, wherein the current rating includes a maximum current rating associated with the frame and a minimum current rating associated with the frame.

3. The frame module of claim 1, wherein the current rating storage unit is further structured to store a custom current rating associated with the circuit breaker and to provide the stored custom current rating to the trip unit when the trip unit is connected to the first interface.

4. The frame module of claim 1, wherein the label is a bi-stable display.

5. The frame module of claim 1, wherein a surface of the label and a surface of the display are substantially coplanar when the trip unit is connected to the frame module.

6. A circuit breaker comprising:
   a frame;
   a trip unit including:
      a display structured to display information; and
   a frame module including:
      a first interface structured to connect to the trip unit;
      a second interface structured to connect to the frame;
      a current rating storage unit structured to store a current rating associated with the frame and to provide the stored current rating to the trip unit when the trip unit is connected to the first interface; and
   a label disposed on an exterior of the frame and indicating the current rating associated with the frame,
   wherein the trip unit is structured to display the stored current rating on the display,
   wherein the display is disposed on a front facing surface of the trip unit,
   wherein the label is disposed on a front facing surface of the frame module such that the stored current rating displayed on the display and the current rating associated with the frame indicated on the label are viewable simultaneously from a single viewpoint when the trip unit is connected to the frame module.

7. The circuit breaker of claim 6, wherein the current rating includes a maximum current rating associated with the frame and a minimum current rating associated with the frame.

8. The circuit breaker of claim 6, wherein the current rating storage unit is further structured to store a custom current rating associated with the circuit breaker and to provide the stored custom current rating to the trip unit when the trip unit is connected to the first interface.

9. The circuit breaker of claim 8, wherein the trip unit is structured to receive the custom current rating from a user and to provide the custom current rating to the frame module.

10. The circuit breaker of claim 6, wherein the label is a bi-stable display.

11. The circuit breaker of claim 6, wherein the frame further comprises:
    a first terminal structured to electrically connect to a power source;
    a second terminal structured to electrically connect to a load;
    separable contacts electrically connected between the first and second terminals; and
    an operating mechanism structured to trip open the separable contacts.

12. The circuit breaker of claim 11, wherein the trip unit is configured to determine when to trip open the separable contacts and to control the operating mechanism to trip open the separable contacts.

13. The circuit breaker of claim 6, wherein the trip unit is structured to read the stored current rating from the current rating storage unit.

14. The circuit breaker of claim 6, wherein the frame is structured to transmit the stored current rating to the trip unit.

15. The circuit breaker of claim 6, wherein the display is a bi-stable display.

16. The circuit breaker of claim 6, wherein the trip unit is structured to display at least one of a current setting, a long delay time, a short delay pickup, and a short delay time on the display.

17. The circuit breaker of claim 6, wherein the trip unit further comprises:
    an input unit structured to allow a user to input trip unit settings.

18. The circuit breaker of claim 6, wherein a surface of the label and a surface of the display are substantially coplanar when the trip unit is connected to the frame module.

19. A method of providing a current rating associated with a frame to a trip unit, the method comprising:
    storing the current rating associated with the frame in a current rating storage unit of a frame module;
    connecting the frame module to the trip unit;
    providing the stored current rating to the trip unit;

indicating the current rating associated with the frame on a label on a front facing surface of the frame module;

displaying the stored current rating on display disposed on a front facing surface of the trip unit, wherein the stored current rating displayed on the display and the current rating associated with the frame indicated on the label are viewable simultaneously from a single viewpoint when the trip unit is connected to the frame module.

20. The method of claim 19, further comprising:

storing a custom current rating in the current rating storage unit.

21. The method of claim 19, wherein a surface of the label and a surface of the display are substantially coplanar when the trip unit is connected to the frame module.

* * * * *